United States Patent [19]

Tavano

[11] Patent Number: 5,738,304
[45] Date of Patent: Apr. 14, 1998

[54] EMERGENCY AIRCRAFT FUEL SYSTEM

[76] Inventor: John B. Tavano, 28 Edgewood Dr., Torrington, Conn. 06790

[21] Appl. No.: 780,944

[22] Filed: Jan. 10, 1997

[51] Int. Cl.⁶ .................................................. B64D 37/32
[52] U.S. Cl. .................................. 244/135 B; 244/135 R; 137/67
[58] Field of Search ........................ 244/135 R, 135 B, 244/121; 137/68.11, 67

[56] References Cited

U.S. PATENT DOCUMENTS

| | | | |
|---|---|---|---|
| Re. 34,939 | 5/1995 | Sturgis | 137/68.11 X |
| 3,035,797 | 5/1962 | Neuschotz | 244/135 R |
| 3,043,542 | 7/1962 | Neuschotz | 244/135 R |
| 3,312,431 | 4/1967 | Vogt | 244/135 R |
| 3,509,942 | 5/1970 | Lindberg | 137/67 X |
| 4,172,573 | 10/1979 | Moore et al. | 244/135 R |
| 4,323,094 | 4/1982 | Paulis et al. | 244/135 R X |
| 4,609,004 | 9/1986 | Greene et al. | 244/135 R X |
| 4,651,952 | 3/1987 | Tavano | 244/135 B X |
| 4,715,417 | 12/1987 | Coloney | 244/135 B X |
| 4,784,354 | 11/1988 | Tavano | 244/135 B |
| 4,886,225 | 12/1989 | Bates | 244/135 R |

*Primary Examiner*—William Grant
*Attorney, Agent, or Firm*—McCormick, Paulding & Huber

[57] ABSTRACT

A fuel tank has an outlet fuel line with a valve adjacent the tank. The valve is air operated open and spring biased toward closed. A frangible envelope surrounds the fuel tank and is pressurized from the same air line as that to the valve so loss of air pressure in the envelope leads to closing of the valve in case of a crash situation that causes the envelope to rupture.

6 Claims, 4 Drawing Sheets

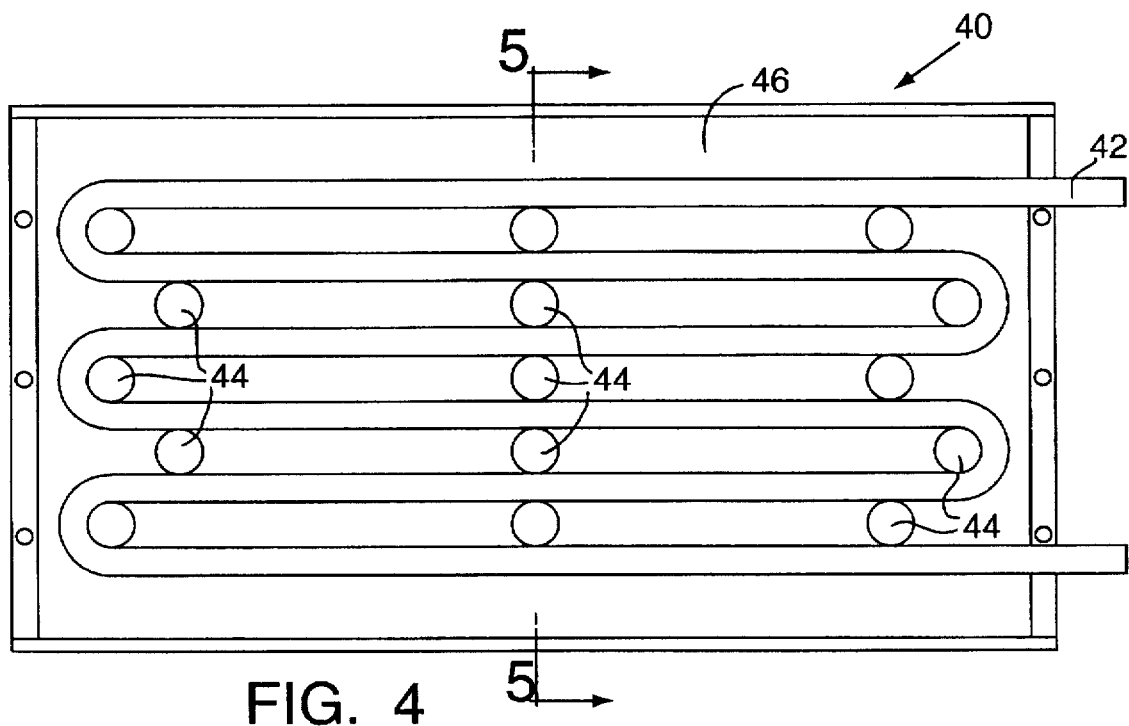
FIG. 4
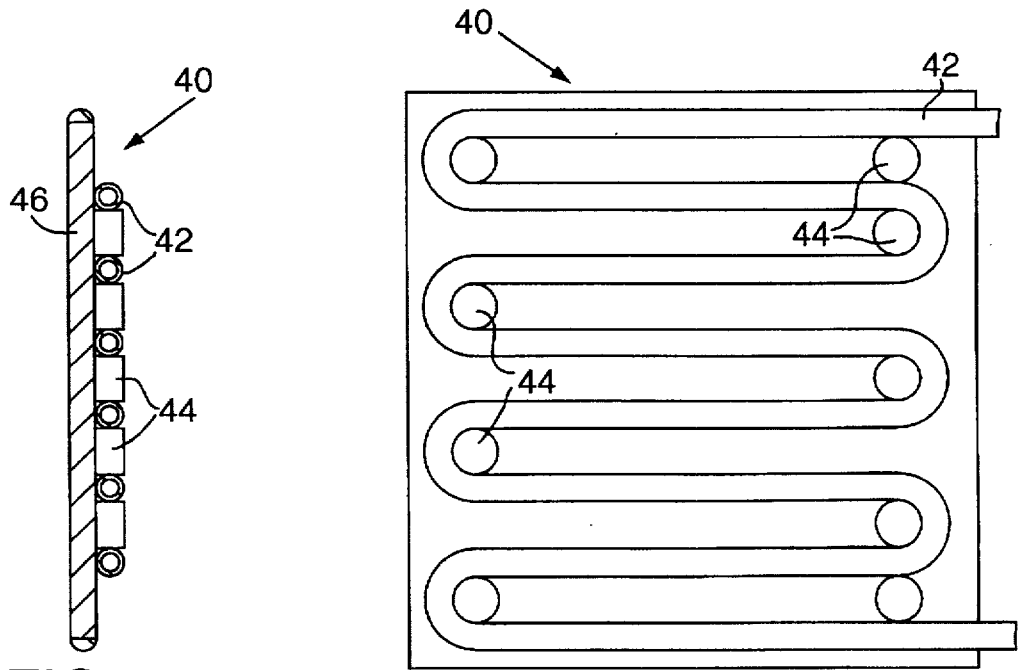
FIG. 5
FIG. 6

EMERGENCY AIRCRAFT FUEL SYSTEM

BACKGROUND OF THE INVENTION

1. Field of the Invention

This invention relates to aircraft fuel systems designed to lessen the catastrophic results of fuel spillage in emergency landing situations. More particularly, this invention relates to fuel tanks designed that are not only designed to resist rupturing during emergency landing conditions but which tanks are also fitted with a frangible exterior envelope surrounding the tank and containing a gas under pressure. This gas pressure when lost will isolate the fuel in the tanks.

2. Description of the Prior Art

Devices which seek to lessen the severity of damage caused by projectiles have taken the form of an inflatable bladder between the fuel tank and other structure associated with the aircraft and particularly with its engine or engine inlet. See for example U.S. Pat. No. 4,886,225. The inflatable bladder is inflated from a regulated gas pressure source prior to combat. Such a bladder protects only one area of the fuel tank adjacent to the engine inlets so that a projectile upon penetrating the bladder and then the fuel tank provides an expansion area for the over-pressure otherwise occurring in the fuel tank itself. With the liquid fuel being allowed to expand slightly into such a bladder, extreme over-pressures are attenuated, and catastrophic fuel expansions are alleviated.

The prior art also discloses emergency fuel tanks that are capable of withstanding considerable impact upon emergency landings. See for example my prior art U.S. Pat. No. 4,784,354. The fuel tank is formed in layers, with elastomeric material comprising at least one or more of the layers, and other layers being formed from stainless steel wire mesh.

A primary concern in connection with any emergency landing in present day aircraft can be traced to the spillage of fuel as a result of such incidents. Such fuel can be contained in the fuel tanks themselves as taught in my prior patent. However, fuel spillage from fuel lines connected to these tanks should be prevented if improvements are to be realized in the incidence of fire associated with such emergency landings in general.

SUMMARY OF THE INVENTION

The presence of fuel shut-off valves between adjacent fuel tanks in a string of tanks provided in modern day aircraft is well known. See for example my prior U.S. Pat. No. 4,784,354. There is a need for providing a virtually automatic method for shutting-off such fuel valves to prevent leakage from the fuel lines themselves in the event of an emergency or crash landing. This result is accomplished in accordance with the present invention by providing a frangible envelope around the individual fuel tanks and pressurizing this envelope to a predetermined gas or air pressure. The fuel line providing the fuel from the tank to the aircraft's engine or an adjacent tank or manifold line is provided with a valve adjacent to the fuel tank itself. This valve will of course selectively prevent the fuel in the tank from entering the fuel line. In accordance with the present invention, the valve is normally closed as for example by a spring and is opened in response to application of gas or air pressure. This gas or air pressure is provided in series with the gas or air pressure in the frangible envelope so that loss of this gas or air pressure, as for example upon impact in a crash landing situation, will result in the loss of gas or air pressure to the valve. As a result of such a loss in gas or air pressure the fuel in the tank is isolated and the likelihood of fire in the event of an aircraft emergency landing situation is significantly reduced.

BRIEF DESCRIPTION OF THE DRAWINGS

FIG. 4 is an elevational view taken from one side of a panel which can be applied to one side of a fuel tank of the type described in the embodiment of FIGS. 1–3 and used in place of the envelope.

FIG. 5 is a sectional view taken generally on the line 5.5 of FIG. 4.

FIG. 6 is a view of an end panel such as might be utilized on a generally rectangular tank, and except for its shape, is otherwise similar to your panel of FIG. 4.

DETAILED DESCRIPTION OF PREFERRED EMBODIMENTS (FIGS. 1–3)

As outlined in my previous U.S. Pat. No. 4,784,354 which is incorporated herein by reference, several tanks are arranged in series with a valve between each tank so as to afford protection for each of the individual tanks. Preferably a containment structure 10 is provided for each of the individual tanks so as to allow for tank expansion in the event of a crash. When an aircraft crashes, large pressures are exerted on the fuel tank. If each fuel tank is provided with a containment structure 10, these pressures can be adsorbed so that the initial shock will not necessarily destroy the tank itself.

Each tank is preferably flexible, being formed with an inner layer 10b impervious to the fuel and an outer layer 10a of reinforced steel mesh or the like. The outermost layer is formed by interwoven stainless steel bands in a structure similar to that suggested in my prior patent where the outer layer comprises woven wires of stainless steel.

Figure 2:
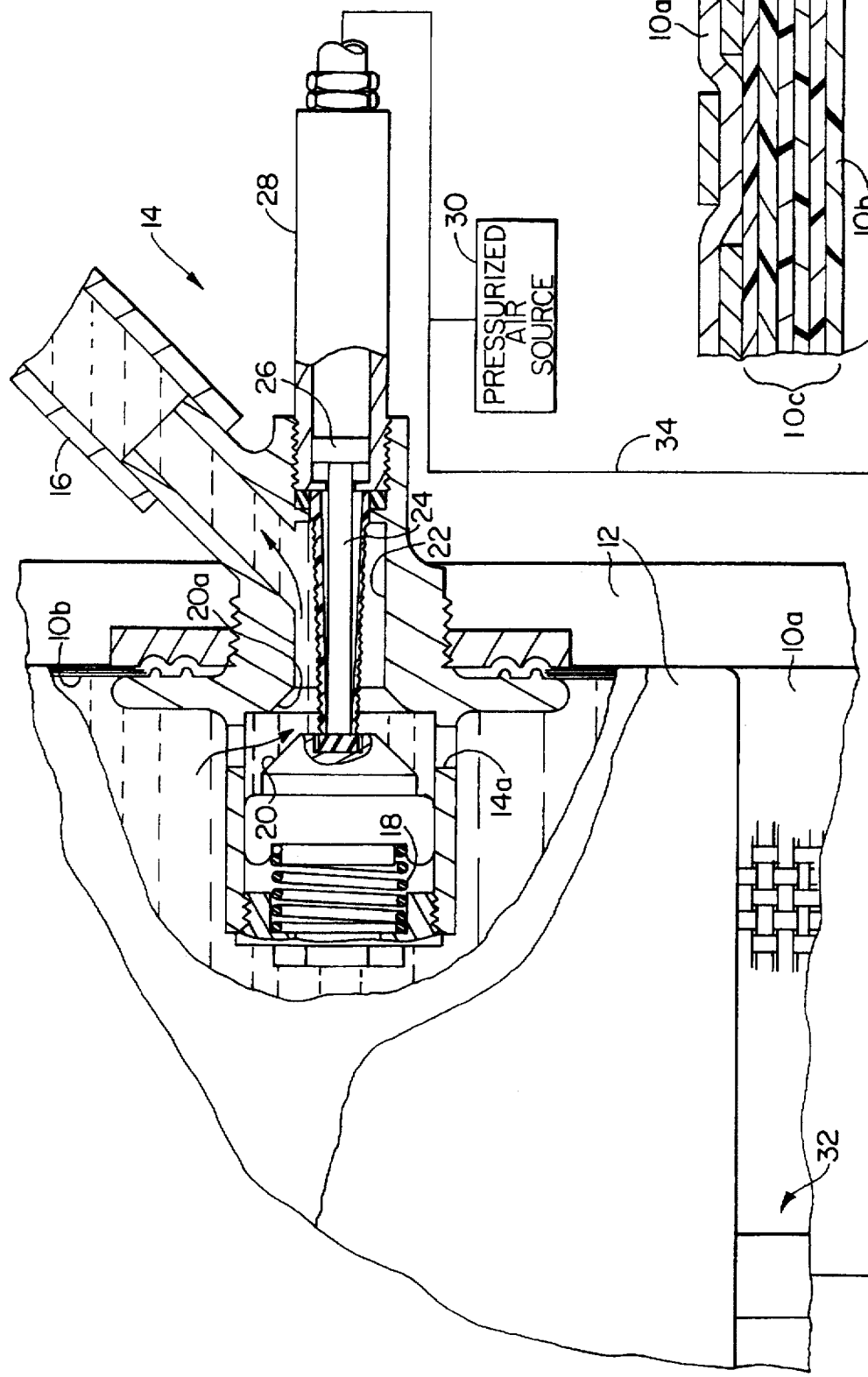
FIG. 2 is a horizontal cross-sectional view of a portion of the FIG. 1 tank showing in schematic fashion the fuel tank fitted with a valve constructed in accordance with the present invention and connected to a source of gas pressure for purposes of valve actuation.
Figure 3:
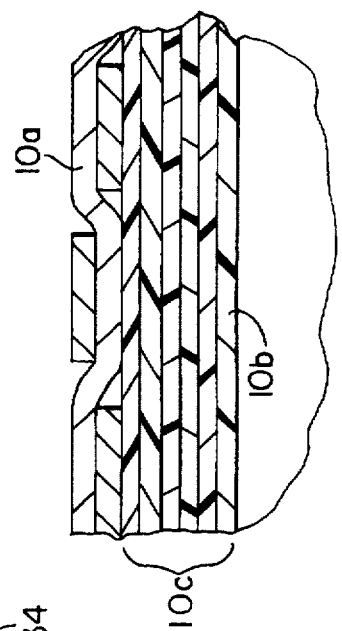
FIG. 3 is a cross sectional view of the fuel tank side wall.

In further accordance with the present invention, and referring now particularly to FIG. 2, the fuel tank sidewall, includes the interwoven stainless steel band outer layer 10a, the inner fuel impervious layer which may be of neoprene or the like 10b, and one or more intermediate layers 10c provided as shown in my prior patent and as shown in FIG. 3.

Still with reference to FIG. 2, it is an important feature of the present invention that the fuel tank be further provided with an exterior envelope 12 that is inflatable and also frangible in the event of an aircraft crash. The presently preferred configuration for the envelope is an elastomeric bladder reinforced with suitable cord material. This envelope 12 may comprise a single unitary structure provided around the entire fuel tank, or in the preferred version comprises an inflatable toroidally shaped bladder wrapped around the fuel tank that is subjected to impact and hence failure in a crash situation.

In further accordance with the present invention, at least one valve 14 is provided for each fuel tank for withdrawing the fuel from the tank and delivering the fuel through a fuel line 16 to the aircraft's engine or engines. Alternatively, the fuel line 16 might simply interconnect two adjacent tanks or could instead provide fuel to an intermediate manifold line. The valve 14 is normally closed by a spring 18, and the valve has a portion provided inside the tank. As shown, the valve element 20 is in an open position and fuel is free to pass through the ports 14a past the valve element 20 and through the central passageway 22 of the valve 14 into the fuel line 16. The valve element 20 is connected by an actuating rod 24 to a piston 26 slidably received in an exterior housing portion 28 of the valve 14. This housing portion 28 of the valve 14 is connected to a source of gas or air under pressure as indicated generally at 30 in FIG. 2. This source of gas or air under pressure may be derived from the bleed air from the turbo jet engine or engines powering the aircraft.

In accordance with the present invention, this source of gas or air pressure 30 also connects to the interior of the envelope 12 as indicated generally at 32 in FIG. 2. Thus, the gas or air pressure source 30 is always available to pressurize the space between the envelope 12 and the fuel tank sidewall 10. This pressure is also available to continually provide pressure for opening the valve 14. Other controls might be provided for opening and closing the valve 14 but the present invention requires only that this valve be operated from the same pressure source 30 as used to pressurize the frangible envelope 12 surrounding the fuel tank.

In the event of an emergency crash landing situation, and more particularly in the event of a crash of sufficient intensity to cause the envelope 12 to rupture, the source of gas under pressure will be dumped from the line 34 associated with the gas pressure source 30. Therefore, gas pressure will no longer be available to the valve 14 to hold valve element 20 in the open position. As a result, the spring 18 will cause the valve element 20 to close against the valve seat 20a isolating the fuel in the fuel tank from the fuel line 16 and also preventing leakage of fuel as a result of such a crash as long as the integrity of the fuel tank 10 is maintained.

Other variations or modifications of the present invention may become apparent in light of the above disclosure. For example, and in keeping with aircraft design tendency toward redundancy, two valves may be provided in association with each aircraft fuel tank so fitted with an air or gas envelope. Both valves would be adapted to close upon loss of gas or air pressure, but during normal operation the failure of one valve mechanism (holding that valve open) would not interrupt the flow of fuel to the aircraft engine from that tank.

Figure 1:
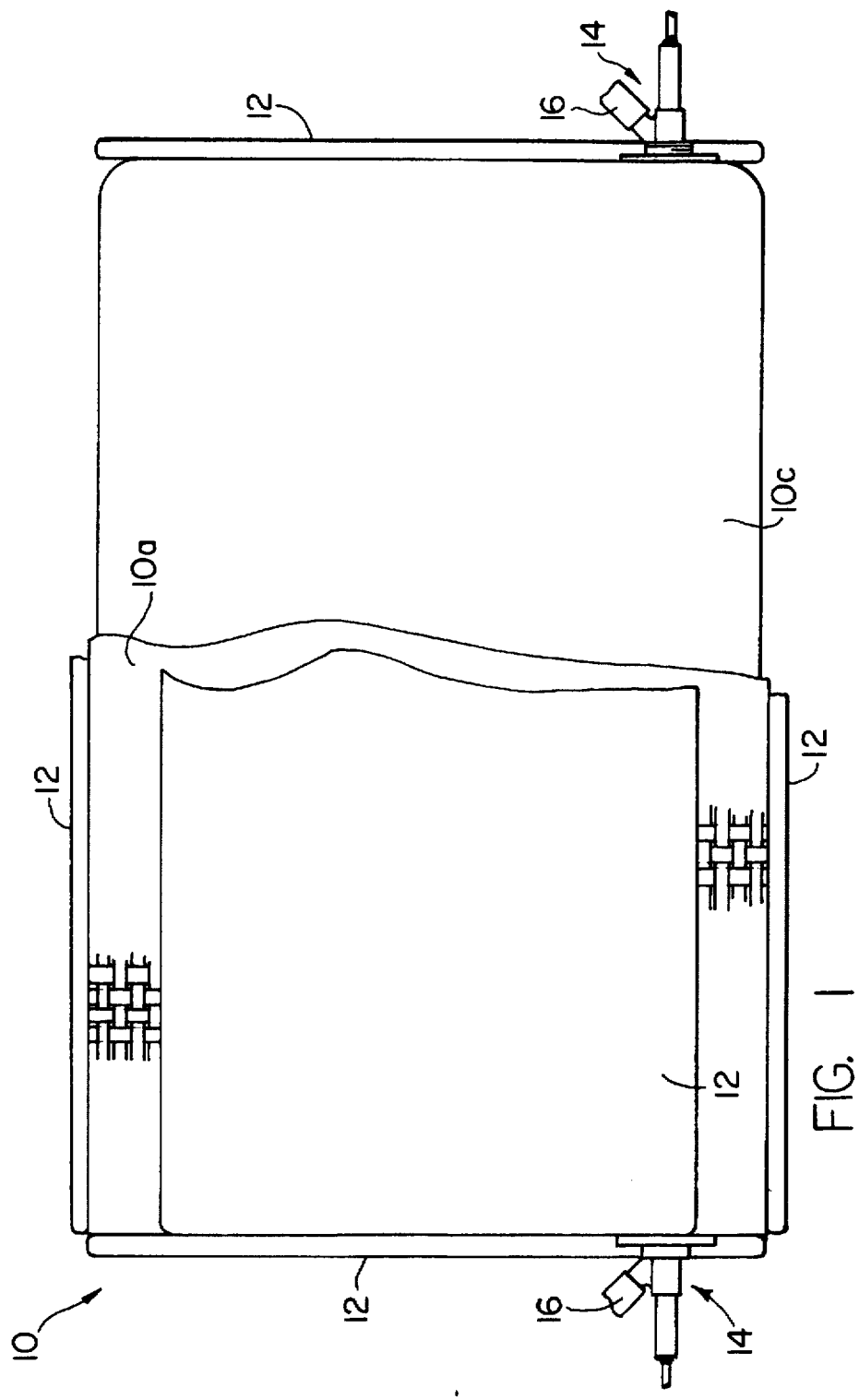
FIG. 1 is a top plan view with portions broken away of a fuel tank configuration that includes an outer bladder, and an inner layer of interwoven stainless steel straps.

In the embodiment of FIGS. 1–3, a frangible envelope is provided around an otherwise conventional fuel tank or a tank constructed in accordance with the teaching of my prior U.S. Pat. No. 4,784,354.

In the embodiment shown in FIGS. 4, 5 and 6, I provide "air panels" 40 on each side of a generally rectangular tank, or surrounding a generally cylindrical tank, in place of the frangible envelope 12 described above with reference to the previous embodiment.

Each of these air panels 40 has a serpentine tubular air line 42 provided around lugs 44 on an aluminum bulkhead 46 so as to serve the same function as the frangible envelope 12.

The principle of operation is the same. Upon impact, the frangible tubing 42 will fail, causing air pressure to be dumped and, in the absence of this air pressure, the fuel valve between the tank and fuel line will close (see the previous embodiment), isolating the fuel in each tank.

Preferably, the tanks are provided with a high degree of impact strength all as described above with reference to my previous Pat. No. 4,784,354, and as described in the previously detailed embodiment.

Other adaptations of the invention will be apparent to those skilled in the art. For example, instead of the aluminum bulkhead with knobs or spacer blocks, one might provide for such knobs on the tank itself, with the result that the frangible tubing is wrapped in a serpentine fashion around these knobs or blocks all as described previously with reference to the air panel of FIG. 4.

Other embodiments can readily be appreciated, for example, a manifold could be provided at one or both ends of a generally cylindrical tank, and tubing segments provided in circumaxially spaced relationship around the tank. The end wall of such a circular tank would be provided with tubing either in the form of such segments, or alternatively, in the form of a serpentine wrapped tubing much as that described herein above with reference to FIG. 4.

It is important to note that the term "envelope" as used in the appended claims is intended to comprise not only the bladder type impact responsive device 12 of the embodiment in FIGS. 1–3, but is also intended to incorporate within its meaning either the serpentine wound tubing as described above with reference to FIGS. 4, 5 and 6, or to instead include within its definition, the above-described tubing segments and manifold structure described above with reference to a generally cylindrical fuel tank.

DETAILED DESCRIPTION OF FIG. 7

Figure 7:
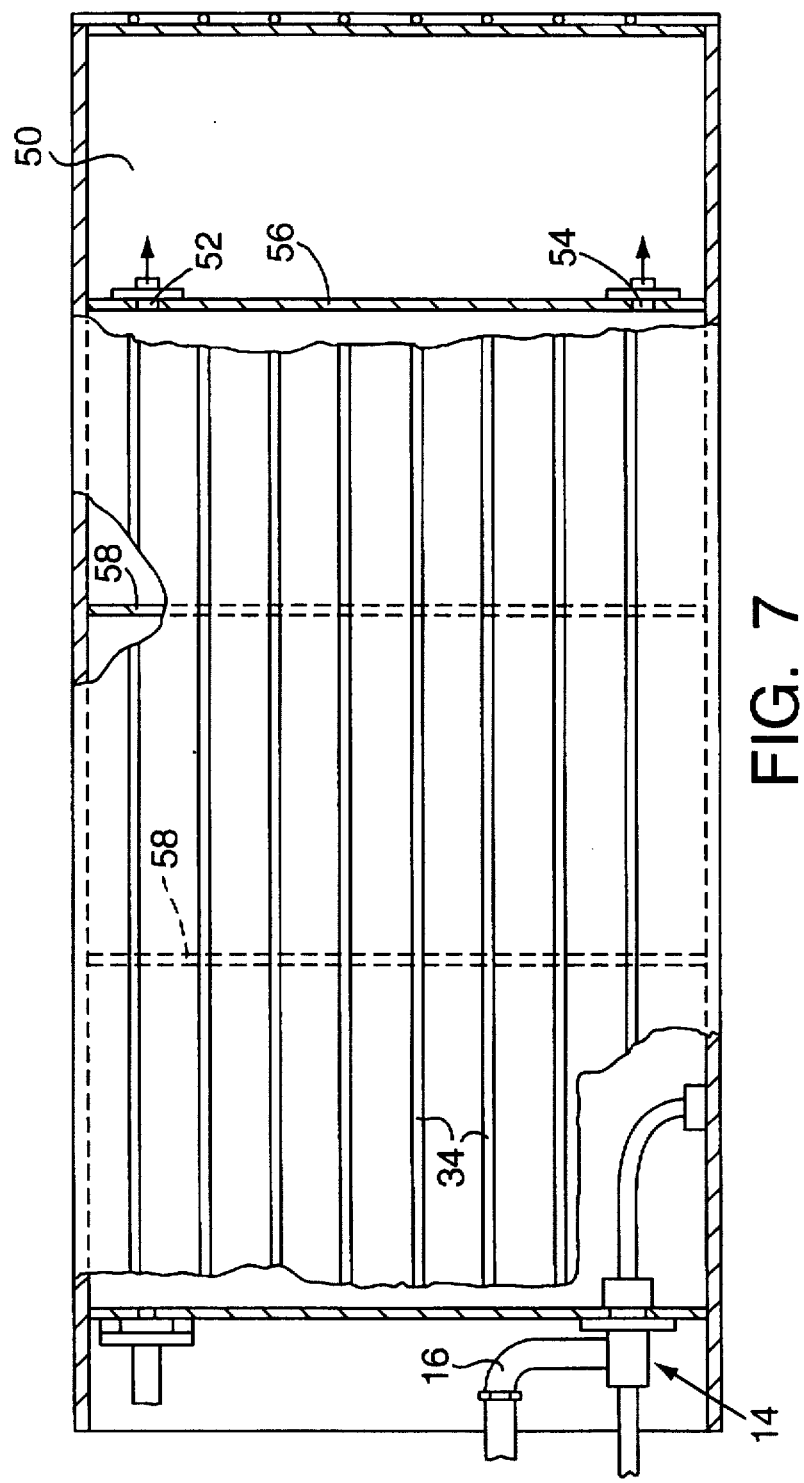
FIG. 7 is a side elevational view of a fuel tank fitted with a shutoff valve such as that shown in FIG. 2, and wrapped with elastomeric tubing as per FIGS. 4, 5, and 6 and further fitted with an expansion chamber in accordance with a further feature of the present invention.

Turning now to a more detailed description of the version of the invention illustrated at FIG. 7, the fuel tank shown in FIG. 7 is preferably fitted with an emergency fuel shutoff valve 14 that is similar to the valve illustrated in FIG. 2 above. More particularly, the valve is provided in a fuel line 16, so as to provide for turning the fuel from the tank to the engine (not shown) on or off, and this fuel shut off valve is normally maintained in an open condition as a result of air pressure provided in the airline 34. The airline 34 is in turn supplied with a source of air under pressure which source is also providing air under pressure to an envelope which may be in the form of an elastomeric tubing wrapped around the fuel tank structure itself as described previously with reference to FIGS. 4, 5 and 6.

FIG. 7 also shows a further feature for an aircraft fuel tank such as that described in the previous embodiments. More particularly, an expansion chamber 50 is provided on at least one end of the fuel tank structure, and is normally empty but communicates with the interior of the fuel tank through ports 52 and 54. These ports 52 and 54 are normally closed by pressure relief valves so that fuel under pressure in the fuel tank itself does not enter the expansion chamber shown unless the pressure in the fuel tank exceeds some predetermined value set well above the normal fuel pressure in that tank.

As a result of this configuration, and in the event of a crash landing or the like, not only is the fuel valve 14 closed as described previously, but the fuel tank itself when collapsed will create internal pressure within the tank so as to exceed the predetermined pressure set in the relief valves, allowing fuel and any fuel vapors in the tank to flow into the expansion chamber 50. As shown, the expansion chamber 50 is defined as an extension of the tank separated from the fuel filled portion of the tank by a bulkhead 56. The fuel tank structure may also include baffle plates such as indicated generally at 58, 58. The baffles 58, 58 serve to prevent sloshing of the fuel within the fuel filled portion of the tank. However, the expansion chamber 50 serves instead to provide an area that is filled with fuel only as a result of internal pressure within the fuel tank overriding the pressure set in the relief valves provided in the ports 52 and/or 54. Only if this predetermined pressure is exceeded will fuel and/or fuel vapors flow from the fuel filled portion of the tank into this chamber 50. Thus, the expansion chamber serves as a further safety feature of a tank constructed in accordance with the present invention, whereby even if the fuel tank should collapse during impact as a result of a crash landing or the like, no fuel will be spilled, and hence the danger of fire will be significantly reduced.

In light of the above, it is therefore understood that within the scope of the appended claims, the invention may be practiced otherwise than as specifically described.

The invention claimed is:

1. In an aircraft fuel system, the improvement comprising:
    a fuel tank having an envelope surrounding the tank, and said envelope being in communication with a source of gas under pressure,
    a fuel line for providing fuel from the tank to an aircraft engine,
    a valve located adjacent the fuel tank for selectively interrupting the fuel flow from the tank into said fuel line, said valve being normally closed, and said valve being opened in response to a gas under pressure supplied to said valve,
    a source of gas under pressure provided both to said envelope and to said valve, whereby loss of gas pressure in said envelope results in closing of the valve and isolation of the fuel in the tank from said fuel line.

2. The aircraft fuel system according to claim 1 wherein said envelope is fabricated from a frangible elastomeric material adapted to fail on impact in the event of an emergency crash landing.

3. The aircraft fuel system according to claim 1 wherein said fuel tank is fabricated from layers of material designed to permit limited flexing of sidewalls of the fuel tank, and the outermost of said layers includes a woven layer of straps of stainless steel.

4. The aircraft fuel system according to claim 3 wherein said envelope is fabricated from at least one frangible elastomeric bladder surrounding the fuel tank whereby the bladder will fail on impact in the event of a crash landing.

5. The aircraft fuel system according to claim 1 wherein said envelope comprises a frangible elastomeric tubing that is wrapped around at least a portion of said fuel tank so as to fail at impact during a crash landing.

6. The aircraft fuel system according to claim 1 wherein said fuel tank further includes a fuel filled portion and an expansion chamber communicating with the fuel filled portion through a port, and a pressure relief valve provided in said port so as to allow fuel tom the fuel filled portion of the fuel tank to move into the expansion chamber in the event of an overpressure in the fuel filled portion created as a result of a reduction in the interior volume of the fuel filled portion.

* * * * *